United States Patent
Zhang et al.

(10) Patent No.: US 11,550,545 B2
(45) Date of Patent: Jan. 10, 2023

(54) LOW-POWER, LOW-MEMORY MULTIPLY AND ACCUMULATE (MAC) UNIT

(71) Applicant: SK hynix Inc., Icheon-si (KR)

(72) Inventors: Fan Zhang, Fremont, CA (US); Aman Bhatia, Los Gatos, CA (US)

(73) Assignee: SK hynix Inc., Icheon-si (KR)

( * ) Notice: Subject to any disclaimer, the term of this patent is extended or adjusted under 35 U.S.C. 154(b) by 84 days.

(21) Appl. No.: 17/091,970

(22) Filed: Nov. 6, 2020

(65) Prior Publication Data

US 2022/0147315 A1 May 12, 2022

(51) Int. Cl.
*G06F 7/544* (2006.01)

(52) U.S. Cl.
CPC .... *G06F 7/5443* (2013.01); *G06F 2207/4824* (2013.01)

(58) Field of Classification Search
CPC .......... G06F 7/5443; G06F 2207/4824; G06F 9/3893
See application file for complete search history.

(56) References Cited

U.S. PATENT DOCUMENTS

| | | | | |
|---|---|---|---|---|
| 4,835,724 A | * | 5/1989 | Costas | G06F 7/5443 708/322 |
| 10,872,295 B1 | * | 12/2020 | Liu | G06F 7/5443 |
| 2018/0307950 A1 | * | 10/2018 | Nealis | G06N 3/063 |
| 2020/0151549 A1 | | 5/2020 | Hwang et al. | |
| 2020/0234126 A1 | | 7/2020 | Covell et al. | |
| 2021/0397414 A1 | * | 12/2021 | Raha | G06F 7/5443 |

OTHER PUBLICATIONS

Abdiyeva, et al., "QL-Net: Quantized-by-LookUp CNN", 15th International Conference on Control, Automation, Robotics and Vision (ICARCV), Nov. 18-21, 2018, 6 pages.

* cited by examiner

*Primary Examiner* — Matthew D Sandifer
(74) *Attorney, Agent, or Firm* — Weaver Austin Villeneuve & Sampson LLP

(57) ABSTRACT

Techniques related to a low-power, low-memory multiply and accumulate (MAC) unit are described. In an example, the MAC unit performs a MAC operation that represents a multiplication of numbers. At least the bit representation of one number is compressed based on a quantization and a clustering of quantization values, whereby index bits are used instead of the actual bit representation. The index bits are loaded in an index buffer and a bit representation of another number is loaded in an input buffer. The index bits are used in a lookup to determine whether the corresponding bit representation and shift operations are applied to the input buffer based on this bit representation, followed by accumulation operations.

20 Claims, 11 Drawing Sheets

LOW-POWER, LOW-MEMORY MULTIPLY AND ACCUMULATE (MAC) UNIT

BACKGROUND

At a hardware level of a processor, a value for a variable can be quantized and the quantization can be represented by a sequence of bits. Further, multiply and accumulate (MAC) operations can be used based on the bit representations.

In deep neural network (DNN) applications (e.g., image processing, video recognition), quantizations may be used to represent values used by a DNN. Generally, the most computationally intensive operations in the training and inference of the DNN are the MAC operations. In computing, especially at digital signal processor (DSP) levels, a MAC operation can compute the product of two numbers and add that product to an accumulator. The hardware unit that performs the operation is known as a MAC unit. The MAC operation modifies an accumulator a: a←a+(b*c). When floating-point numbers are used in the MAC operation, it might be performed with two roundings (typical in many DSPs) or with a single rounding. The DNN can use millions to billions of floating-point weights, and hence the floating-point MAC operation consumes a significant amount of power. This becomes a critical issue when DNNs are deployed to an edge device or an Internet of Things (IoT) device, such as a cellphone, a solid-state drive (SSD), or a camera, which has limited memory footprint and power budget.

BRIEF SUMMARY

Techniques and systems are described and relate to a low-power, low-memory MAC unit that implements MAC operations. The MAC operations may be used in, but are not limited to, DNN training and/or DNN inference.

In one example, a system implements a method. The method includes determining that a first number is to be multiplied by a second number, and performing a MAC operation to multiply the first number by the second number. Performing the MAC operation includes determining an index of a quantization level associated with the first number, where the index is represented by "m" bits, where the quantization level is represented by "l" bits, and where "l" is larger than "m." Performing the MAC operation also includes determining, by at least using the index in a lookup of a table, "r" sets of "k" bits, where "r*k" is equal to "l," and where the "l" bits comprise the "r" sets of "k" bits. Performing the MAC operation also includes using the "r" sets of "k" bits in shift and accumulation operations applied to an input buffer that stores a bit representation of the second number.

This illustrative example is mentioned not to limit or define the disclosure, but to provide an example to aid understanding thereof. Additional embodiments and examples are discussed in the Detailed Description, and further description is provided there.

BRIEF DESCRIPTION OF THE DRAWINGS

An understanding of the nature and advantages of various embodiments may be realized by reference to the following figures.

DETAILED DESCRIPTION

Figure 1:
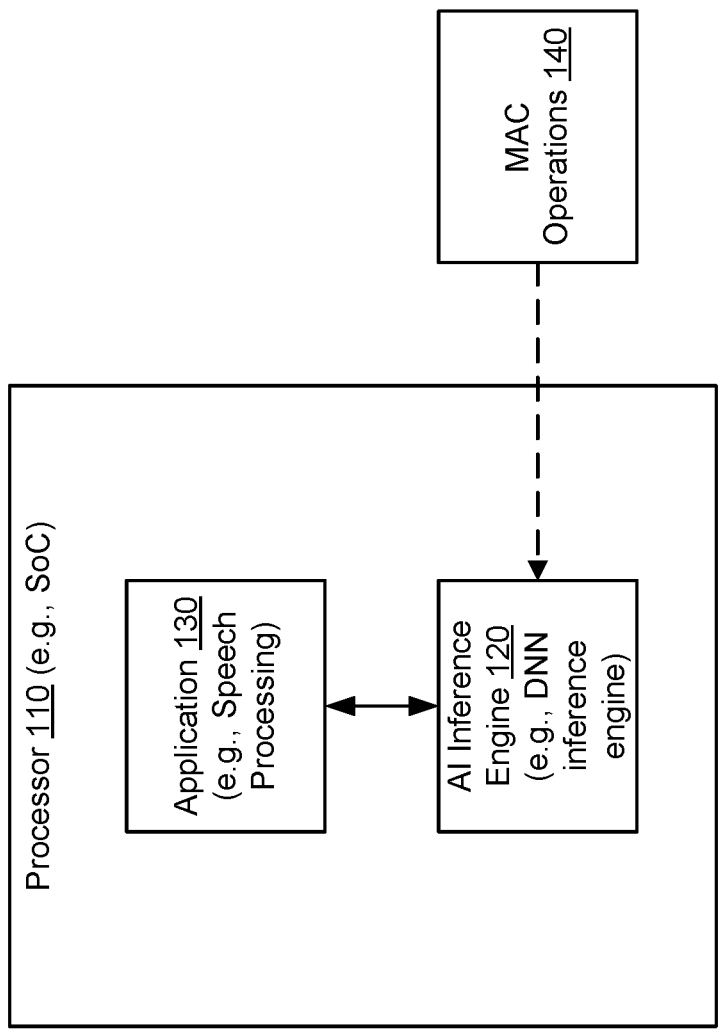
FIG. 1 illustrates an example of a processor that implements an artificial intelligence (AI) inference engine, in accordance with certain embodiments of the present disclosure.

Techniques related to a low-power, low-memory MAC unit are described. In an example, a device determines that a multiplication of two numbers should be performed. At a hardware level, a MAC operation is performed by the MAC unit based on bit representations of the two numbers. At least a first one of the numbers is quantized to generate a first bit representation that corresponds to the first number's quantization level. The first bit representation is associated with an index of the quantization level, where the index has a relatively smaller number of bits. In other words, the index represents a compression of the first bit representation. The quantization may use a flexible power-of-two (FPoT) non-uniform quantization to allow for a target distribution of quantization levels. Rather than storing the first bit representation, the index is stored as the corresponding quantization of the first number. During the MAC operation, a first register is used, whereby the size of this register corresponds to the number of bits of the index. A second register is used for the second bit representation of the second number. A decompression is performed by determining the first bit representation based on the index. A portion of the first bit representation is input to the first register to perform a shift operation followed by an accumulate operation on the second register. The shift and accumulate operations are repeated for each remaining portion of the first bit representation. Thereafter, the result of the accumulate operations represents, at least in part, the multiplication of the two numbers. When the flexible PoT non-uniform quantization is used, the target distribution of quantization levels can be achieved to substantially cover a target dynamic range. In addition, because an index is used rather than a full bit representation, memory storage space can be saved. Further, because the MAC operation uses a register having a smaller number of bits (e.g., corresponding to the index), a more computationally efficient MAC unit is possible. Hence, all in all, a low-power (due to the computational efficiency), low-memory (due to the memory storage efficiency) MAC unit not only is possible, but can also substantially cover a target dynamic range.

To illustrate, consider an example of a DNN inference engine implemented on a device for image processing. This engine uses non-linear transformations, each of which corresponds to a node at a layer of the DNN and multiplying a variable with a weight. There can be millions if not billions of weights depending on the structure of the DNN. A weight is quantized in a 16-bit floating-point representation. In turn, the 16-bit representation is compressed into a 3-bit index that represents the quantization level of the weight from eight quantization levels. A table is generated and associates the 3-bit index of each of the eight quantization levels with the corresponding 16-bit floating-point representation. Hence, rather than storing millions (or billions) of 16-bit floating-point representations of the weights, millions (or billions) of 3-bit indexes and the table are stored. To multiply a variable with a weight, an input buffer of the MAC unit stores a bit representation of the variable, and a weight buffer of the MAC unit stores the three bits of the index. The three bits from the weight buffer are used in a lookup of the table to determine the corresponding 16-bit floating-point representation. Shift and accumulate operations are applied to the input buffer based on portions of the 16-bit floating-point representation, the result of which represents, at least in part, the multiplication of the variable by the weight.

In the interest of clarity of explanation, embodiments of the present disclosure are described in connection with a DNN. However, the embodiments are not limited as such and similarly apply to any other type of artificial intelligence (AI) model or any multiplication of numbers that can be implemented in hardware, at least in part, by using a MAC unit.

FIG. 1 illustrates an example of a processor 110 that implements an AI inference engine 120, in accordance with certain embodiments of the present disclosure. The AI inference engine can be an AI model that has been trained to perform a particular task. For instance, the AI model is a DNN trained for image processing tasks, video tasks, speech processing tasks, or any other tasks. In this case, the AI inference engine 120 is a DNN inference engine. An application 130 of the processor 110 may input, through a call to the AI inference engine 120, data to the AI inference engine for a task and may receive output data of the AI inference engine 120 that indicates the result of performing the task. Performing the task by the AI inference engine 120 may involve a substantially large number of transformations, each of which may include one or more multiplications of numbers. For instance, in the case of the DNN inference engine, the transformations include non-linear transformations between nodes at different layers of the DNN, each of the non-linear transformations multiplying a variable by a weight of the connection or edge between two nodes. Some or all of the multiplications may be performed by using MAC operations 140. For instance, the AI inference engine 120 includes, at the hardware level (e.g., a DSP level), one or more MAC units to perform the MAC operations.

In an example, the processor 110 is implemented as a system on a chip (SoC) of a device. The device can be a mobile device, such as a cell phone or a wearable device, an IoT device, an edge device, or any other device suitable to host the AI inference engine 120.

The AI inference engine 120 may be trained offline on a different device, in which case the two devices collectively represent a system. Additionally or alternatively, the AI inference engine 120 may be trained on the same device, or trained offline and further trained on the device. Once trained, the AI model may be represented by a hardware configuration on the processor 110. For instance, the hardware configuration may represent weights of edges between nodes in the case of the DNN. The application 130 may represent program code implemented in software and/or firmware and may rely on inferences of the AI inference engine 120 to process various data (e.g., images, video, audio).

Figure 2:
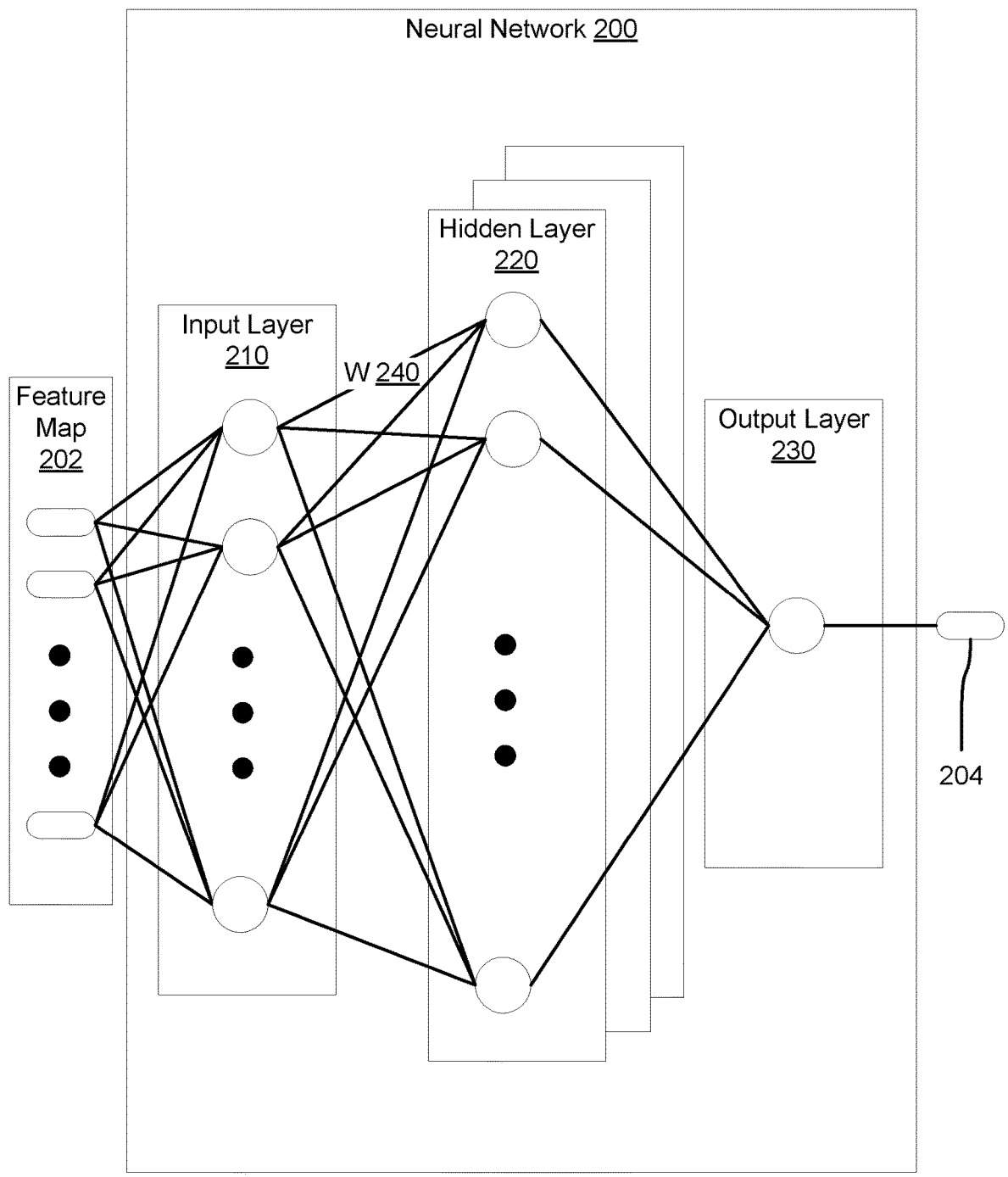
FIG. 2 illustrates an example of an AI model that, upon training, can be used as an AI inference engine, in accordance with certain embodiments of the present disclosure.

FIG. 2 illustrates an example of an AI model that, upon training, can be used as an AI inference engine, such as the AI inference engine 120, in accordance with certain embodiments of the present disclosure. In the illustrative example of FIG. 2, the AI model 200 is a neural network 200, such as a DNN, although other types of AI models are possible. A feature map 202, representing input data of an application such as the application 130, is input to the neural network 200. In turn, the neural network 200 outputs a result 204 of performing a task (e.g., an image classification, an object detection, a probability indication). Although a single result corresponding to a single task is illustrated, the output can include multiple results depending on the structure of the neural network. Further, although the feature map 202 is illustrated as being input, the input data may be directly input to an input layer of the neural network 200, where this input layer may generate the feature map 202.

As illustrated, the neural network 200 includes multiple layers. Features from the feature map 202 are connected to input nodes in an input layer 210 of the neural network 200. The result 204 is generated from an output node of an output layer 230. One or more hidden layers 220 of the neural network 200 exist between the input layer 210 and the output layer 230. The neural network 200 is pretrained to process the features from the feature map 202 through the different layers 210, 220, and 230 in order to output the result 204.

In some embodiments, the neural network 200 is a multilayer neural network that represents a network of interconnected nodes, such as an artificial DNN, where knowledge about the nodes (e.g., information about specific features represented by the nodes) is shared across layers and knowledge specific to each layer is also retained. Each node represents a piece of information. Knowledge can be exchanged between nodes through node-to-node interconnections. Input to the neural network 200 activates a set of nodes. In turn, this set of nodes activates other nodes, thereby propagating knowledge about the input. This activation process is repeated across other nodes until nodes in an output layer are selected and activated.

As illustrated, the neural network 200 includes a hierarchy of layers representing a hierarchy of nodes interconnected in a feed-forward way. The input layer 210 exists at the lowest hierarchy level and includes a set of nodes referred to herein as input nodes. When the feature map 202 is input to the neural network 200, each of the input nodes of the input layer 210 is connected to each feature of the feature map. Each of the connections has a weight. These weights are one set of parameters derived from the training of the neural network 200. The input nodes transform the features by applying an activation function to these features. The information derived from the transformation is passed to the nodes at a higher level of the hierarchy.

The output layer 230 exists at the highest hierarchy level and includes one or more output nodes. Each output node provides a specific result 204. The hidden layer(s) 220 exists between the input layer 210 and the output layer 230. The hidden layer(s) 220 includes "N" number of hidden layers, where "N" is an integer greater than or equal to one. In turn, each of the hidden layers also includes a set of nodes referred to herein as hidden nodes. Example hidden layers include up-sampling, convolutional, fully connected layers, and data transformation layers.

At the lowest level of the hidden layer(s) 220, hidden nodes of that layer are interconnected to the input nodes. At the highest level of the hidden layer(s) 220, hidden nodes of that level are interconnected to the output node(s). The input nodes are not directly interconnected to the output node(s). If multiple hidden layers exist, the input nodes are interconnected to hidden nodes of the lowest hidden layer. In turn, these hidden nodes are interconnected to the hidden nodes of the next hidden layer, and so on and so forth.

An interconnection represents a piece of information learned about the two interconnected nodes. The interconnection has a numeric weight 240 that can be tuned (e.g., based on a training dataset), rendering the neural network 200 adaptive to inputs and capable of learning.

Generally, the hidden layer(s) 220 allows knowledge about the input nodes of the input layer 210 to be shared among the output nodes of the output layer 230. To do so, a transformation $f$ is applied to the input nodes through the hidden layer 220, whereby an input X is transformed into an output Y. Generally, a transformation includes a multiplication of a variable represented by node by a weight of a connection of the node with a node of the next hierarchy level. The transformation can also be non-linear. For instance, at a first hierarchy level, $x \in X$ is input. A first node of the hierarchy is connected to a second node at the next hierarchy level, where the connection has a weight w1. x is transformed at the first node, where y1=w1×x. At the next hierarchy level, a non-linear transformation is used at the second node, where y2=$f$(y1+b1) and b1 is a bias term. In turn, the second node is connected to a third node at the next hierarchy level. The transformation between these two layers is set as y3=w2×y2, where w2 is the weight between the two nodes.

In an example, an input signal x is often of a 32-bit or 64-bit floating-point format (FLP-32 or FLP-64). The edge weight matrices W1 and W2 and the bias terms b1 and b2 are also of FLP-32 or FLP-64 format. The floating-point multiplication of w1×x and w2×y2 consumes most of the power. $f(\cdot)$ is an activation function, such as a ReLu function. The weights in W1 and W2 often follow a highly non-uniform probability distribution, as described in FIG. 5.

During the training, the neural network 200 also uses a loss function l (or also referred to as a cost function c) to find an optimal solution. The optimal solution represents the situation where no solution has a loss less than the loss of the optimal solution. In an example, the loss function l includes a mean squared error function that minimizes the average squared error between an output $f(x)$ and a target value y over all example pairs (x, y). A backpropagation algorithm that uses gradient descent to minimize the loss function is used to train the neural network 200.

As such, the hidden layer(s) 220 retains knowledge about the input nodes. A set of knowledge is shared across the output node(s) based on the interconnections of the hidden nodes and the input nodes.

Figure 3:
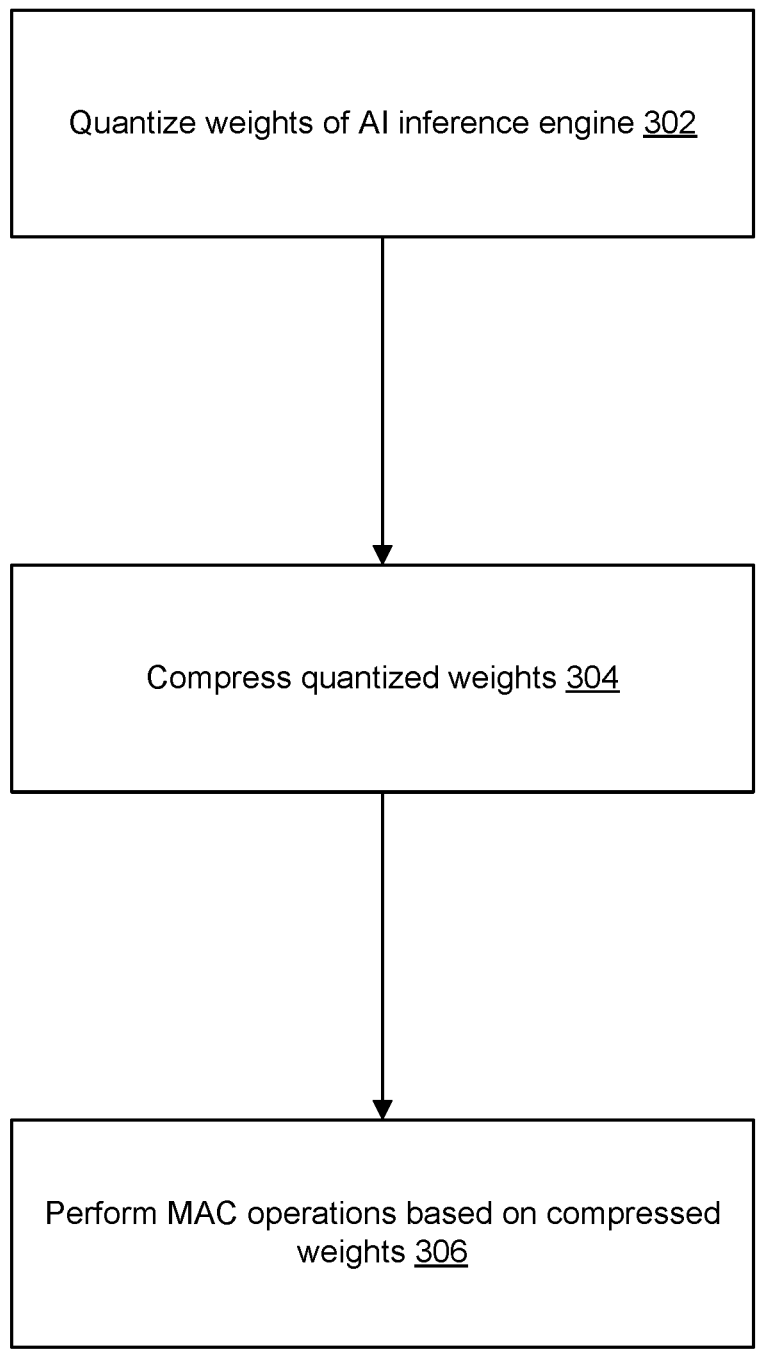
FIG. 3 illustrates an example of a flow for performing a compression-based MAC operation, in accordance with certain embodiments of the present disclosure.

FIG. 3 illustrates an example of a flow for performing a compression-based MAC operation, in accordance with certain embodiments of the present disclosure. The flow can be performed by a system that includes one or more processors, such as the processor 110 of FIG. 1. The flow is also illustrated in connection with weights of an AI inference engine, such as the weights of the neural network 200 of FIG. 2. However, the flow is not limited as such and similarly applies to a MAC operation on bit representations of numbers that are to be multiplied. As described below, operations of the flow can be performed by the system. Some or all of the instructions for performing the operations can be implemented as hardware circuitry and/or stored as computer-readable instructions on a non-transitory computer-readable medium of the system. As implemented, the instructions represent modules that include circuitry or code executable by processor(s) of the system. The use of such instructions configures the system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

As illustrated, the flow starts at operation 302, where the system quantizes weights of the AI inference engine. Weights are examples of numbers used in multiplications. Different quantization schemes are possible. In a first example, a uniform quantization is used and is expressed as $$Q^u(\alpha, b) = \alpha \times \left\{ 0, \frac{\pm 1}{2^{b-1}-1}, \frac{\pm 2}{2^{b-1}-1}, \frac{\pm 3}{2^{(2^{k-2})}}, \ldots, \pm 1 \right\},$$

where $\alpha$ is a scaling factor and b is the bit resolution (e.g., target number of bits). In a second example, a PoT quantization is used and is expressed as $$Q^P(\alpha, b) = \alpha \times \left\{ 0, \pm 2^{-2^{b-1}+1}, \pm 2^{-2^{b-1}+2}, \ldots, \pm 2^{-1}, \pm 1 \right\},$$

where $\alpha$ is a scaling factor and b is the bit resolution. In a third example, an adaptive power-of-two (APoT) quantization is used and is expressed as $$Q^a(\gamma, kn) = \gamma \times \left\{ \sum_{i=0}^{n-1} p_i \right\},$$

where $$p_i \in \left\{ 0, \frac{1}{2^i}, \frac{1}{2^{i+n}}, \ldots, \frac{1}{2^{i+(2^k-2)}n} \right\},$$

where $\gamma$ is a scaling factor, and where k and n are integers. In a fourth example, an FPoT quantization is used and is expressed as $$Q^f(\beta, r, k) = \beta \times S, S \subset C, C = \left\{ \sum_{i=0}^{r} = p_i \right\},$$

where $$p_i \in \left\{ 0, 1, \frac{1}{2^1}, \frac{1}{2^2}, \ldots, \frac{1}{2^{(2^k-2)}} \right\},$$

where β is a scaling factor, and where k and r are integers and k×r is the bit resolution. The output of any of these quantization examples is a quantization value per weight, where the quantization value can be represented by a bit representation, such as a floating-point representation or a fixed-point representation. Relative to the uniform quantization, the PoT quantization can provide better power and memory performances when implemented in hardware because it can be implemented by shifting bits in a register. Relative to the PoT, the APoT can provide higher resolution of the quantization values. Relative to the APoT, the FPoT can further improve power and memory performances because it allows a better distribution of the quantization values over a target dynamic range and hence more flexibility in terms of clustering the quantization values into clusters according to a target weight distribution, as further described in the next figures.

At operation 304, the system compresses the quantized weights. Rather than using the bit representations of the quantized values (floating point or fixed point), an index is used where the index has a smaller number of bits and is associated in a table (e.g., a compression table or codebook) with bit representation of a quantization level. An example of this compression process is further described in FIG. 10. Briefly, the quantization values are clustered into "Q" groups, where "Q" is an integer and where each group represents a quantization level and is associated with a bit representation of that quantization level. The clustering can account for a performance of the AI model (e.g., can be fine-tuned such that the performance is not significantly impacted). When FPoT quantization is used, the clustering can also account for a target weight distribution (e.g., the clusters can be defined to achieve this distribution). The number of bits used for the index is a function of "Q" (e.g., number of bits=$2^Q$). Hence, rather than storing bit representations for each of the quantization values, indexes of quantization levels that group the quantization values are stored, where the indexes have a smaller number of bits than the bit representations and are associated therewith in the table.

At operation 306, the system performs MAC operations based on compressed weight. Referring to the AI inference engine, a MAC operation can be performed to multiply a variable by a weight as part of a transformation function. The index of the weight is used, whereby the bits of this index are loaded in a weight buffer. These bits are looked up to determine the corresponding bit representation of the quantization level. The bits of the variable are loaded into an input buffer and are shifted and accumulated based on the bit representation. An example of the MAC operation is further described in FIG. 9.

Figure 4:
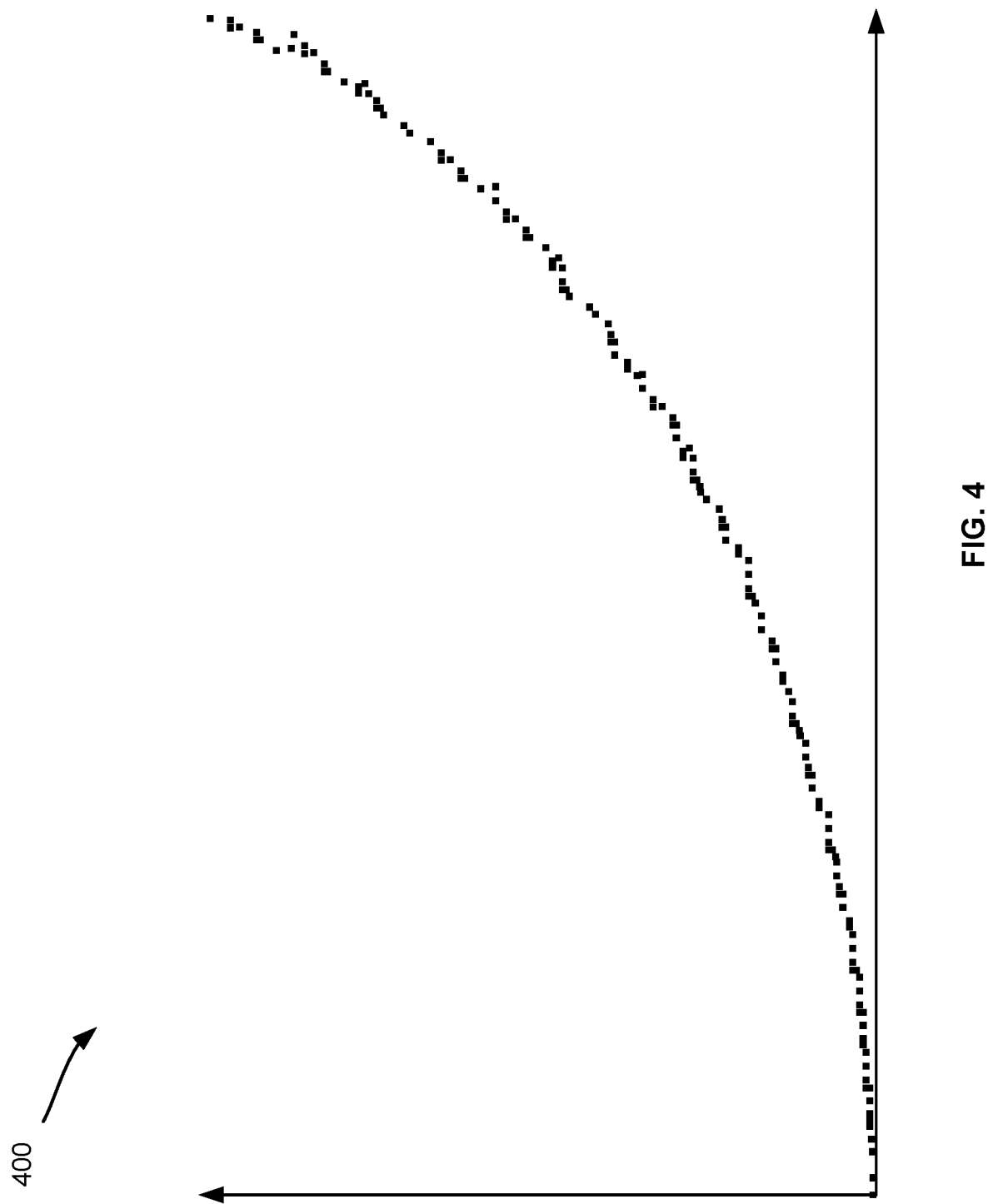
FIG. 4 illustrates an example of quantization values, in accordance with certain embodiments of the present disclosure.

FIG. 4 illustrates an example of quantization values 400, in accordance with certain embodiments of the present disclosure. Here, an FPoT quantization is used to generate the quantization values. The horizontal axis represents a floating-point input. The vertical axis represents a floating-point output per the FPoT quantization. A 16-bit resolution is illustrated in FIG. 4, with k=4 and r=4. Each point in the curve represents a quantization value. As shown, the quantization values 400 have a fairly good distribution over the entire dynamic range. In comparison, if an APoT or a PoT quantization were used, their distributions would be sparser at the end and denser at the center. Hence, the FPoT quantization allows an improved clustering of the quantization values to achieve a target distribution, as further described in FIGS. 5 and 6.

Figure 5:
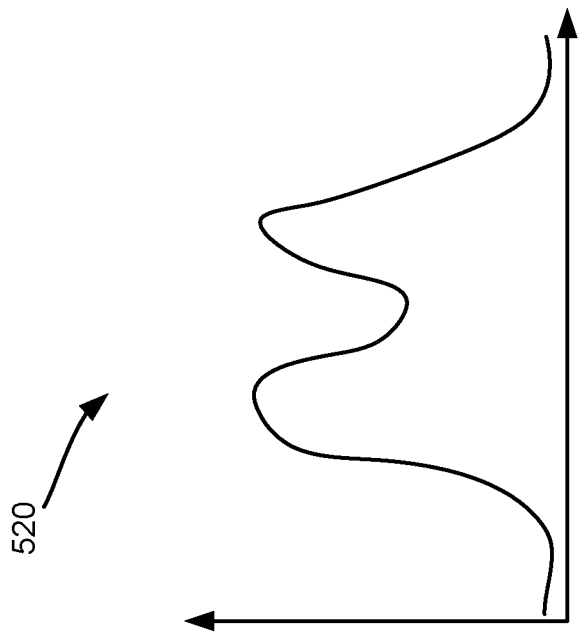
FIG. 5 illustrates an example of a target weight distribution, in accordance with certain embodiments of the present disclosure.
Figure 5:
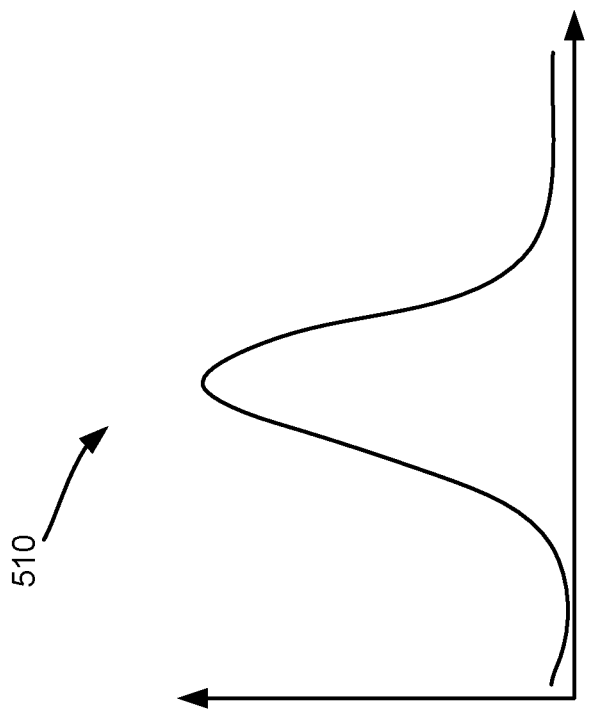

FIG. 5 illustrates an example of a target weight distribution, in accordance with certain embodiments of the present disclosure. Weights correspond to an AI model, such as the neural network model 200 of FIG. 2. On the left-hand side, a first weight distribution 510 of the weights before pruning is illustrated. On the right-hand side, a second weight distribution 520 of the weights after pruning is illustrated. The horizontal axis represents the values of the weights. The vertical axis represents a count of the weights. Each of the weights can be quantized to a quantization value. Hence, the first weight distribution 510 and the second weight distribution 520 can similarly represent distributions of the quantization values before and after pruning. As shown in the example of FIG. 5, the first weight distribution 510 and the second weight distribution 520 are highly non-uniform probability distributions. When the FPoT quantization is used, clustering of the quantization levels can be performed to generate clusters having a target distribution set to be the same or close to the first weight distribution 510 (before pruning) or the second weight distribution 520 (after pruning).

Figure 6:
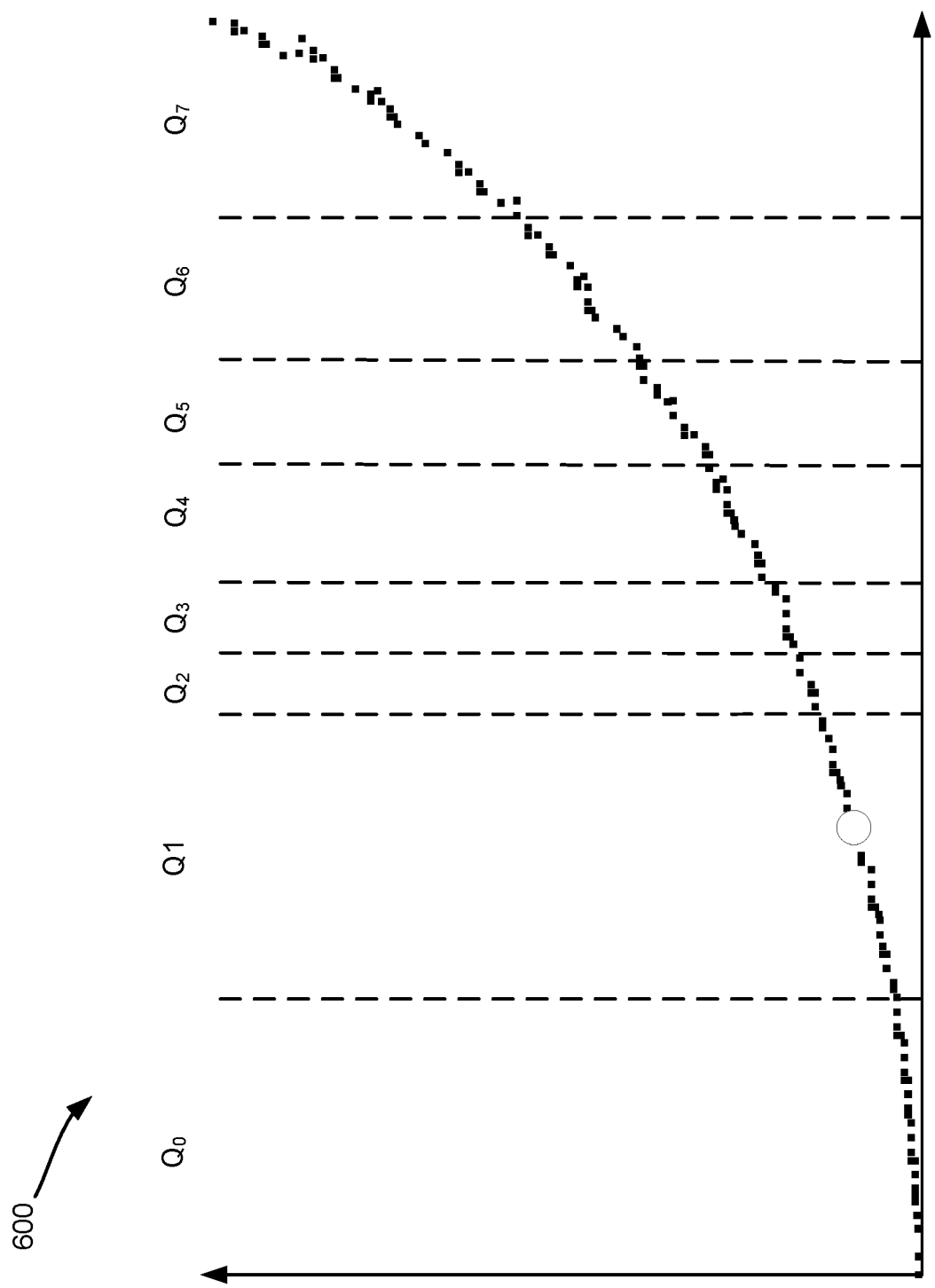
FIG. 6 illustrates an example of clustering of quantization values based on a target weight distribution, in accordance with certain embodiments of the present disclosure.

FIG. 6 illustrates an example of clustering 600 of quantization values based on a target weight distribution, in accordance with certain embodiments of the present disclosure. Here, the quantization values correspond to those of FIG. 4. The clustering 600 includes eight groups (e.g., Q=8), each of which is indexed with an index between zero and seven (e.g., $Q_i$, where i={0, 1, 2, . . . , 7}). A number other than eight is also possible and is provided herein for illustrative purposes. Each $Q_i$ group represents a quantization level. The size of each $Q_i$ group (i.e., the number of quantization values that is included in the $Q_i$ group) is set to achieve the target weight distribution (or, similarly, the target weight quantization values distribution). Hence, the sizes can vary between $Q_i$ groups such that the total count of quantization values in each $Q_i$ group can follow the target weight distribution (e.g., to follow the non-uniform probability distribution before or after pruning, as illustrated in FIG. 5). In an example, k-means clustering iteratively generates the $Q_i$ groups, and the number of these groups can change to meet a target performance, as further described in FIG. 10.

In addition, each cluster can be represented by a statistical point (shown in FIG. 6 with a blank circle in the $Q_1$ group). Different definitions of the statistical point are possible, including, for instance, a center or a mean. The statistical point corresponds to a quantization value that has a bit representation. Hence, all the quantization values that are clustered in a $Q_i$ group are represented by the single bit representation of the statistical point of the $Q_i$ group. The index "i" of each group and the bit representation of the statistical point (and/or, similarly, the quantization value of the statistical point) are stored in a table, thereby associating the index "i" with the bit representation (and/or the quantization value). During a MAC operation, bits of an index can be used in a lookup of the table to then determine the corresponding $Q_i$ group and bit representation.

Figure 7:
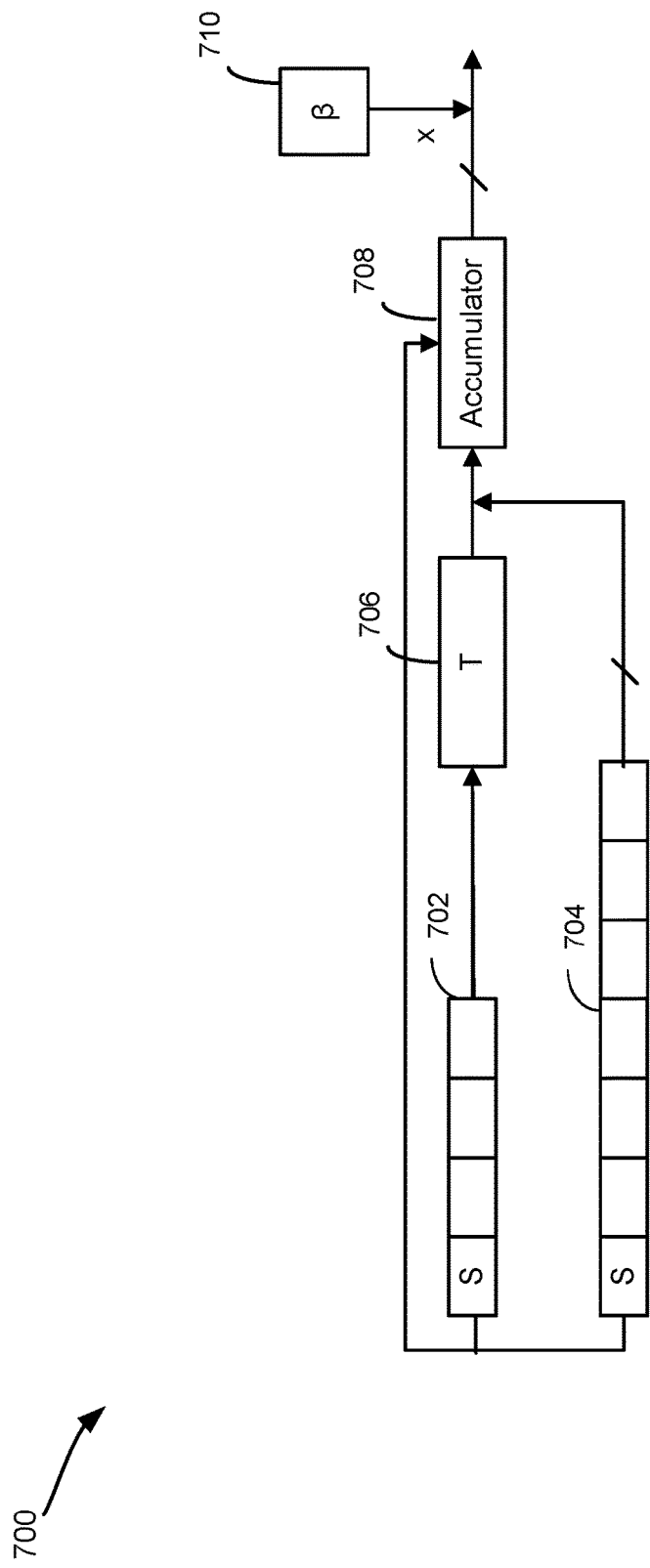
FIG. 7 illustrates an example of a MAC unit, in accordance with certain embodiments of the present disclosure.

FIG. 7 illustrates an example of a MAC unit 700, in accordance with certain embodiments of the present disclosure. In an example, the MAC unit 700 includes an index buffer 702, an input buffer 704, a table 706, an accumulator 708, and a scale factor 710. The index buffer 702 may also be referred to herein as a "weight buffer" when used in connection with an AI inference engine.

In an example, the index buffer 702 is used to load the bits of a first number to be multiplied by a second number (e.g., an input number). The bits can correspond to a compressed representation of the first number and are referred to herein as index bits. For instance, and referring back to an AI inference engine, the first number is a weight and the index bits are those of an index to a quantization level (e.g., the index "i" of a quantization group $Q_i$). The index buffer 702 can also store a bit that represents the sign of the first number (shown as "S" in FIG. 7, where "S" can be set to "1" for a positive number and a "0" for a negative number, or vice versa).

The input buffer 704 is used to load the bits of the second number. The second number can have a floating-point or a fixed-point representation. The bits are referred to herein as input bits. Generally, the input buffer 704 is larger than the index buffer 702. The input buffer 704 can also store a bit that represents the sign of the second number (shown as "S" in FIG. 7, where "S" can be set to "1" for a positive number and a "0" for a negative number, or vice versa).

The table 706 can be a compression table or a codebook that associates bits of indexes with bit representations of quantization levels. For example, each index in the table 706 is the index "i" of a quantization group $Q_i$, where quantization group $Q_i$ is the quantization level. The table 706 associates the index "i" with the bit representation of the statistical point of the quantization group $Q_i$ (and/or the actual quantization value of this statistical point).

The accumulator 708 may include an accumulator buffer to hold intermediate results. An intermediate result can be a shift of the input bits in the input buffer 704 based on the index bits in the index buffer 702. The intermediate result can also account for the signs of the first and second numbers.

The scale factor 710 can be a factor by which the output of the accumulator 708 is scaled. This factor can depend on the type of the quantization. For instance, for a uniform or a PoT quantization, the scale factor 710 is a. For an APoT quantization, the scale factor 710 is γ. For an FPoT quantization, the scale factor 710 is β.

In operation, the index bits and the sign bit are loaded in the index buffer 702. The input bits and the sign bit are loaded in the input buffer 704. The index bits are used to look up the table 706 and determine the corresponding bit representation. Based on this bit representation, a set of shifts of the input bits (e.g., left shifts) is performed, each shift followed by an accumulation operation by the accumulator 708. An XOR operation is also performed by the accumulator 708 using the sign bits from the index buffer 702 and the input buffer 704. Thereafter, the output of the accumulator 708 is scaled by the scaling factor 710. The scaled output corresponds to a bit representation of the multiplication of the first and second numbers.

FIG. 3 illustrates an example of a flow for performing operations based on compressions of bit representations of quantization values. The flows can be performed by a system that includes one or more processors, such as the processor 110 of FIG. 1. The flows are also illustrated in connection with weights of an AI inference engine, such as the weights of the neural network 200 of FIG. 2. However, the flows are not limited as such and similarly apply to MAC operations on bit representations of numbers that are to be multiplied. As described below, operations of the flows can be performed by the system. Some or all of the instructions for performing the operations can be implemented as hardware circuitry and/or stored as computer-readable instructions on a non-transitory computer-readable medium of the system. As implemented, the instructions represent modules that include circuitry or code executable by processor(s) of the system. The use of such instructions configures the system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

Figure 8:
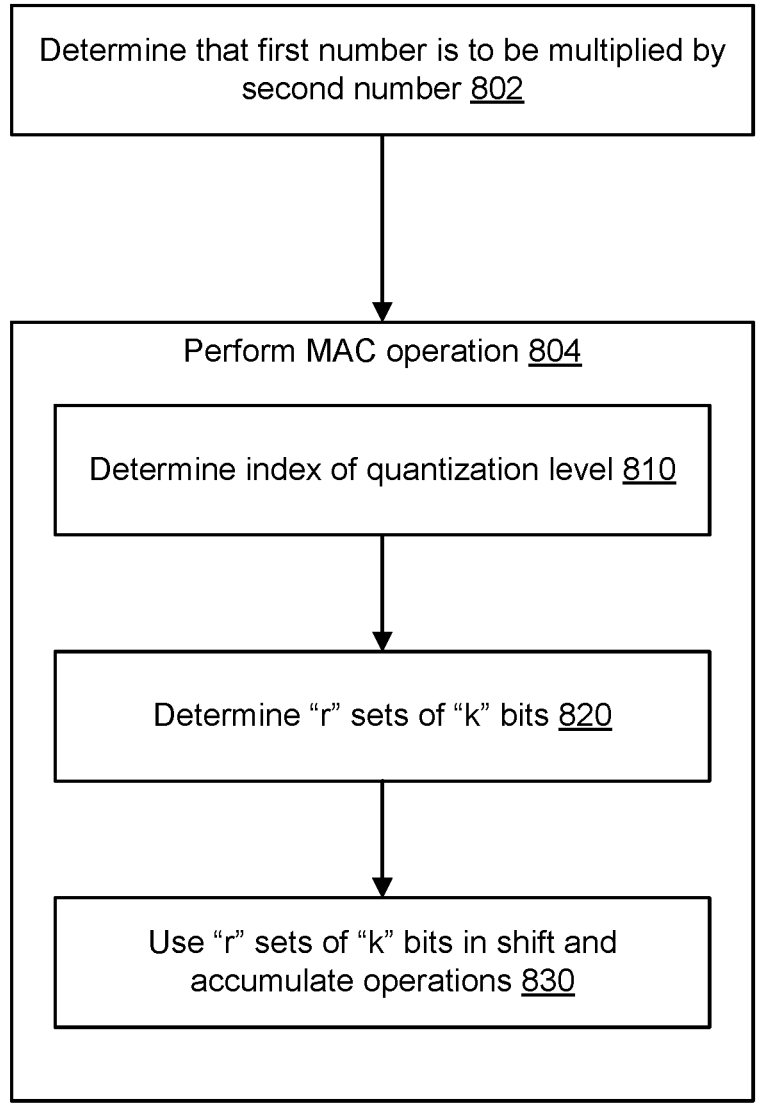
FIG. 8 illustrates an example flow for performing a MAC operation by a MAC unit, in accordance with certain embodiments of the present disclosure.

FIG. 8 illustrates an example flow for performing a MAC operation by a MAC unit, in accordance with certain embodiments of the present disclosure. As illustrated, the flow may start at operation 802, where the system determines that a first number is to be multiplied by a second number. For example, the system includes an AI inference engine. In this example, the first number is a weight of an AI model implemented by the AI inference engine. The second number is a variable of a transformation function of the AI model, where the transformation function includes a multiplication of the variable by the weight.

At operation 804, the system performs a MAC operation to multiply the first number by the second number. The MAC operation can be performed by using bit representations and can include a set of shift operations, each followed by an accumulation operation. In an example, at least the bit representation of the first number is a compressed representation. Rather than using the bit representation, an index is used as input to an index buffer. The index is associated with q quantization level (e.g., a "$Q_i$ group") that represents a group of quantization values. The index bits are then used in a lookup of the table to determine the bit representation of the quantization level, where the shift operations depend on the bit representation.

In an example, the quantization of the first number that resulted in a quantization value and the associated bit representation of the first number is an FPoT quantization. In this example, performing the MAC operation 804 can include multiple sub-operations 810-830 as illustrated in FIG. 8.

At a first sub-operation 810, the system determines n index of a quantization level associated with the first number, where the index is represented by "m" bits, where the quantization level is represented by "l" bits, and where "l" is larger than "m." For instance, the "m" bits are used to refer to a $Q_i$ group that clusters quantization values of the AI model's weights. "l" can be 32 or 64 and can correspond to an FLP-32 or FLP-64 format, although a fixed-point format is also possible.

At a second sub-operation 820, the system determines, by at least using the index in a lookup of the table, "r" sets of "k" bits, where "r*k" is equal to "l," and where the "l" bits include the "r" sets of "k" bits. "r" and "k" can be parameters of the FPoT quantization as described in FIG. 3. The "l" bit representation of the first number can be divided into "r" sets, each of which is "k" bits long.

At a third sub-operation 830, the system uses the "r" sets of "k" bits in shift and accumulation operations applied to an input buffer that stores a bit representation of the second number. The bit representation can be a floating-point representation or a fixed-point representation, and this bit representation may not be compressed (although it is possible to compress it, in which case another table can be used to determine the bit representation and load it in the input buffer of the MAC unit). Each shift operation shifts the input bits to the left by one set "r" of "k" bits (e.g., if "r" is equal to four and "k" is equal to three, there would be four shift operations, each shifting the input bits to the left by three). The shift operations can be followed by accumulation operations and an XOR operation to update the sign of the resulting bits. These bits can be scaled by the β scaling factor of the FPoT quantization, resulting in an output bit representation of the multiplication.

Figure 9:
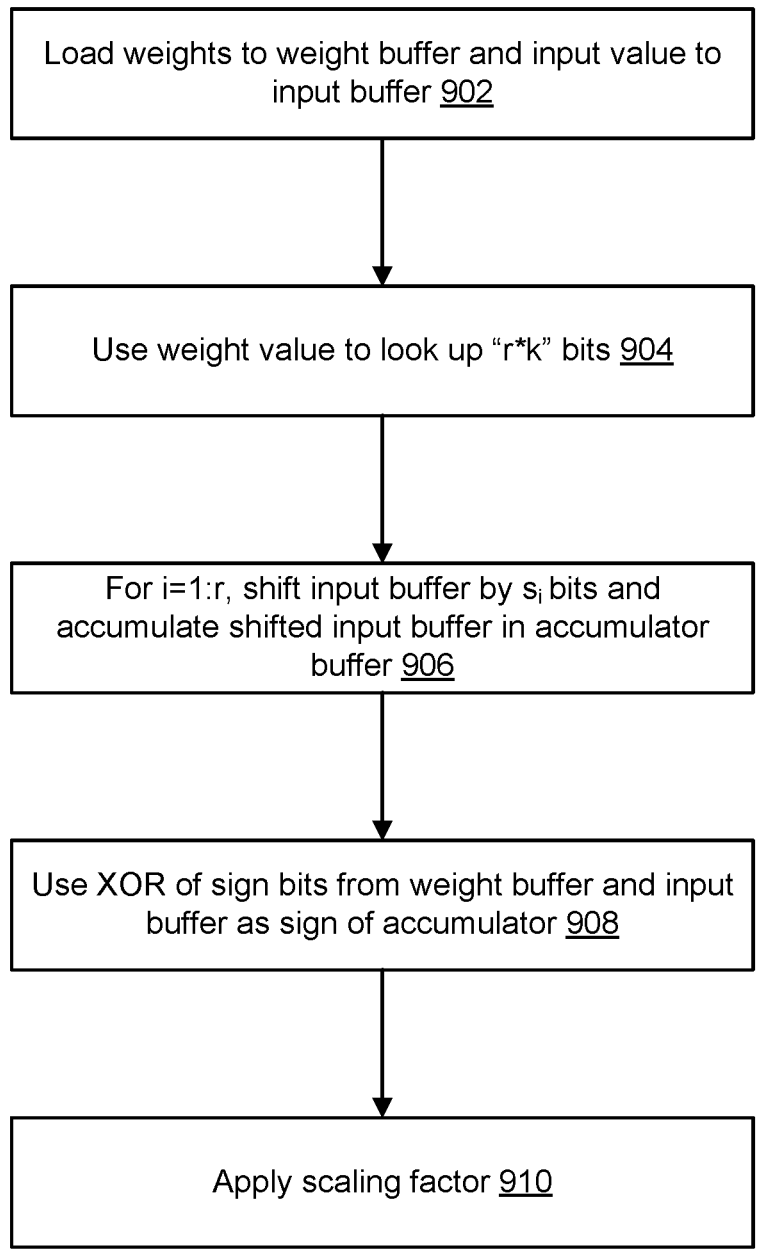
FIG. 9 illustrates another example flow for performing a MAC operation by a MAC unit, in accordance with certain embodiments of the present disclosure.

FIG. 9 illustrates another example flow for performing a MAC operation by a MAC unit, in accordance with certain embodiments of the present disclosure. The flow can be performed as sub-operations of operation 804 of FIG. 8. Here, the flow is described specifically in connection with weights of an AI inference engine, although the flow can similarly apply to other types of numbers and/or number multiplications. The flow is also illustrated in connection with an FPoT quantization, although the flow can similarly apply to other types of quantization, where once the decompression of a weight index occurs, the number of shift operations and the amount of shift per shift operation can depend on the specific quantization type (e.g., with a uniform quantization, the shift is by one; for a PoT quantization, the shift is by "b"; for APoT, the shift is by "k"). In the interest of clarity of explanation, the FPoT quantization is illustrated with each of "k" and "r" being equal to four. Further a ceil(log 2(Q))=3 or eight totally non-uniform quantization levels are used (e.g., "m" is equal to three such that an index is represented by three bits, in addition to its sign bit). Each of these eight values can be represented by a sum of four values from the set $$\left\{0, 1, \frac{1}{2^1}, \frac{1}{2^2}, \ldots, \frac{1}{2^{(2^4-2)}}\right\}.$$

As illustrated, the flow may start at operation 902, where the system loads a weight to a weight buffer and loads an input value to an input buffer. Loading the weight may include loading the 3-bit index of the weight in addition to its sign bit. The input value is that of a variable to be multiplied by the weight. The input buffer can store six bits of the bit representation of the input value in addition to its sign bit. A high-precision fixed-point format is used on input values as an example, but other formats are possible.

At operation 904, the system uses the weight value to look up "k*r" bits. "k*r" corresponds to "l" bits of a quantization level. The lookup can use the index bits of the weight, where these index bits were loaded in the index buffer per operation 902. For instance, the 3-bit index is used to look up the "k*r" bits. This lookup identifies (s1,s2, . . . sr) sets (e.g., four sets) "$s_i$," where each set has "k" bits (e.g., four bits) from the table.

At operation 906, the system, for i=1:r (e.g., for one to four), shifts the input buffer to the left by $s_i$ bits and accumulates the input bit into the accumulator buffer. For instance, four shift operations are performed. After the first operation, the input buffer is shifted to the left by $s_1$ bits. After the second operation, the input buffer is shifted to the left by $s_2$ bits. After the third operation, the input buffer is shifted to the left by $s_3$ bits. And after the fourth operation, the input buffer is shifted to the left by $s_4$ bits. Each of the first, second, and third shift operations is followed by an accumulation operation.

At operation 908, the system uses the XOR of the sign bits from the weight buffer and input buffer as the sign bit of the accumulator. For instance, an XOR operation is performed on the sign bits and the resulting sign is set as the sign of the accumulated bits.

At operation 910, the system applies a scaling factor to the output of the accumulator. For example, the output is multiplied by the β of the FPoT quantization. This multiplication can be done either in the full-precision fixed-point or floating-point format or also in the FPoT format, while the latter necessitates the β scaling factor to be chosen from another sum-of-PoT set which allows values higher than one.

Figure 10:
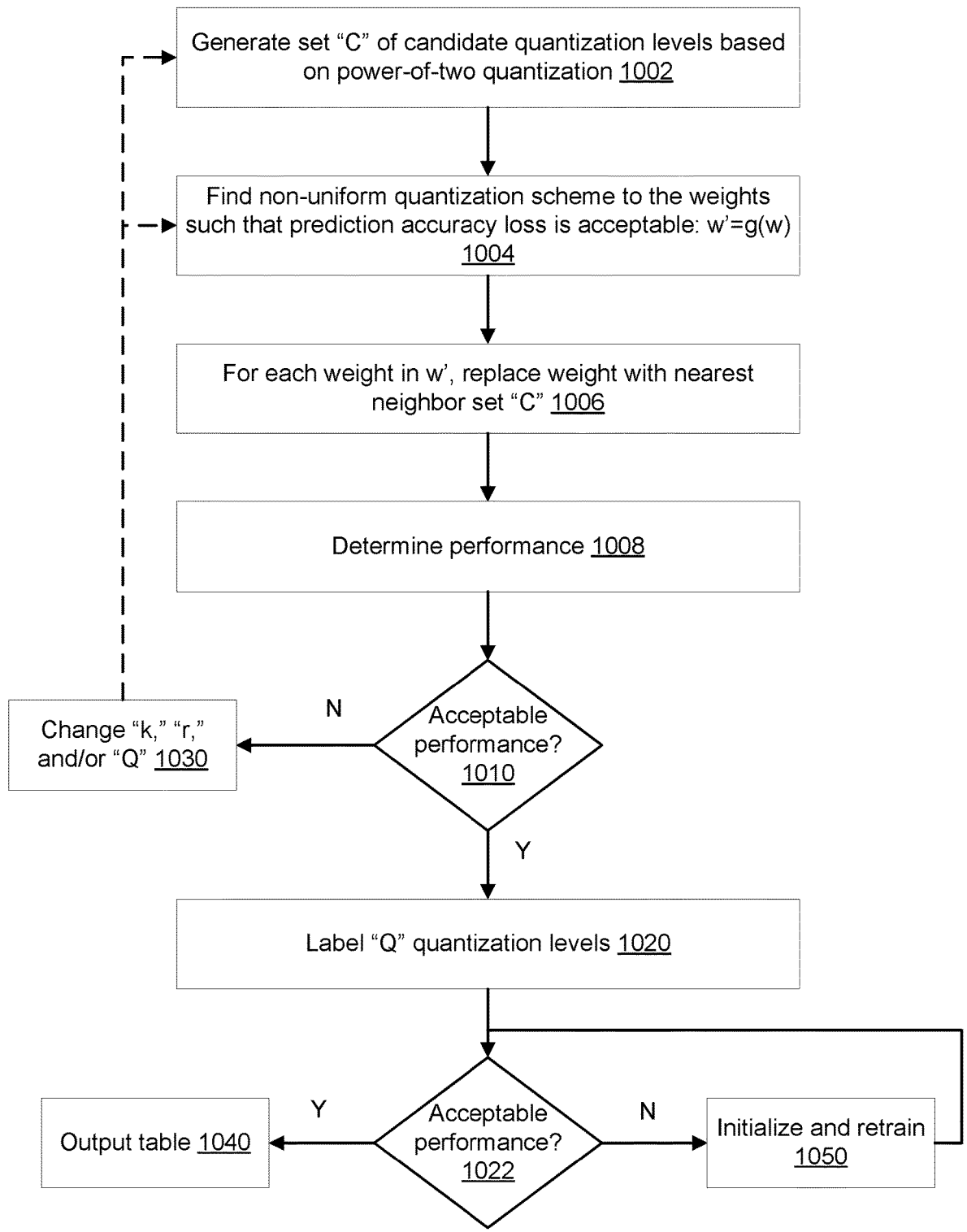
FIG. 10 illustrates another example flow for compressing quantization levels, in accordance with certain embodiments of the present disclosure.

FIG. 10 illustrates another example flow for compressing quantization levels, in accordance with certain embodiments of the present disclosure. The flow can be performed prior to the flows of FIGS. 8 and 9 to generate quantization levels and related compressions. The flow can be performed on a device other than the one performing the flows of FIGS. 8 and 9. Once the flow is performed, the result can be used to implement an AI inference engine to which the flows of FIGS. 8 and 9 can apply. Here also, the flow is illustrated in connection with an FPoT quantization, although the flow can similarly apply to other types of quantization, where once quantization values are generated, these values can be clustered and compression can be defined based on the clustering. Nonetheless, and as described in connection with FIGS. 4-6, FPoT can provide additional flexibility of the clustering to meet a target weight distribution.

Per the FPoT quantization, for all the values that a floating-point number can represent, there are some values that can lead to simple multiplication operation. For example, if a floating-point number x (multiplicand) is multiplied to ⅛ (multiplier), the exponent (including the sign) can be simply subtracted by three. If a fixed-point number x (multiplicand) is multiplied to ⅛ (multiplier), the mantissa of the multiplicand can be shifted by three (with zero-padding to the left). All the values that preserve this property form a set "S." The idea behind FPoT is to ensure all the quantized weights belong to "S" so that the multiplication can be done easily.

The flow of FIG. 10 is described in connection with converting a floating-point DNN into a FPoT format. When the FPoT quantization is used, the weights in the DNN are quantized to certain quantization values, which can be described in the equation $$\mathcal{Q}^f(\beta, r, k) = \beta \times S, S \subset C, C = \left\{\sum_{i=0}^{r} = p_i\right\},$$

where $$p_i \in \left\{0, 1, \frac{1}{2^1}, \frac{1}{2^2}, \ldots, \frac{1}{2^{(2^k-2)}}\right\},$$

where β is a scaling factor, and where k and r are integers and k×r is the bit resolution. This equation basically says that the value of every quantized weight belongs to a set "S," which is a subset of "C," which contains all candidate quantization values of the sum of "r" numbers, each of which belongs to the PoT fractional set. β is a full-precision scaling factor.

As illustrated, the flow may start at operation 1002, where the system generates a set "C" of candidate quantization values based on a PoT quantization. For instance, the set "C" is $$\left\{\sum_{i=0}^{r} = p_i\right\},$$

where $$p_i \in \left\{0, 1, \frac{1}{2^1}, \frac{1}{2^2}, \ldots, \frac{1}{2^{(2^k-2)}}\right\}.$$

At operation 1004, the system finds a non-uniform quantization scheme to the weights so that the prediction accuracy loss is acceptable: w'=g(w). In an example, k-means clustering algorithm is used to find "Q" groups of the weights, where "Q" is the number of quantization levels for the non-uniform quantization and the center of each cluster (or some other statistical point thereof) is the quantization level. Per this operation, the candidate quantization values are clustered in the "Q" clusters, where each of the "Q" clusters comprises a subset of the candidate quantization values and is represented by a statistical point based on the subset. The clustering can be based on a target distribution of quantization values, as illustrated in FIGS. 5-6.

At operation 1006, the system, for each weight in w', replaces it by the nearest number in set "C." For instance, the system replaces, for a first cluster of the "Q" clusters, the statistical point with a value from the set "C." The value can be the nearest neighbor. This replacement can be repeated and performed for each remaining cluster of the "Q" clusters.

At operation 1008, the system determines a performance of the AI inference engine using weights from w'. For instance, ground truth data (e.g., known data for which an output of the AI inference is known) is input to the AI inference engine to measure the performance. The performance can be a function of the known output and the actual output that the AI inference engine produced.

At operation 1010, the system determines whether the performance is acceptable. For instance, the performance can be compared to a performance threshold. If larger than the performance threshold, the performance is acceptable, and operation 1020 follows operation 1010. Otherwise, the performance is unacceptable, and operation 1030 follows operation 1010. The performance threshold can depend on the application for which the AI inference engine is used.

At operation 1020, the performance is acceptable, and the system labels the "Q" quantization levels from the set of {0, 1, . . . , Q−1}. Each label is an index. The labels form a set "S." Instead of using "r*k" bits to represent each weight, a table "T" is generated to associate the quantization level index (0,1, . . . to Q−1) to its corresponding "r*k" bit representation. Each weight can be represented by ceil(log 2(Q))=bits (e.g., the number "m" of index bits is ceil(log 2(Q))).

At operation 1030, the performance is unacceptable, and the system changes any of "k," "r," and/or "Q." For instance, any or each of these parameters can be increased by one or some other integer increment. If any of "k" or "r" is changed, the flow loops back to operation 1002 to repeat operations 1002-1010. If "Q" is changed, the flow loops back to operation 1004 to repeat operations 1004-1010.

In an example, operations 1008-1020 (including any loop(s) through operation 1030) represent an operation of generating the table "T." This table "T" includes a first index corresponding to the first cluster and associates the first index with an "l" bit representation of the value of the statistical point of this first cluster (or, equivalently, the "r*k" bit representation thereof). The table includes similar associations between indexes and "l" bit representations of the remaining statistical points of the remaining clusters.

At operation 1022, the system determines again whether the performance of the AI inference engine is acceptable. Here, the weights of the AI model are initialized by using quantization level bit representations from the table. The AI model is retrained based on the initialized weights. For instance, the system initializes a floating-point AI model with the floating-point representations of the weights obtained from operation 1020 and retrains the AI model with floating-point weights. Its performance is then determined and compared to the same or a different performance threshold than the one of operation 1010. If the performance is acceptable, operation 1040 follows operation 1022. Otherwise, operation 1050 follows operation 1022.

At operation 1040, the performance is acceptable and the table "T" is output. This table can be subsequently used in compression and decompression of bit representations that use the FPoT quantization of operation 1002 set with the parameters "k" and "r," (if any, adjusted per operation 1030).

At operation 1050, the performance is unacceptable, the system reinitializes and retains the AI model, similar to operation 1022, and the flow loops back to operation 1022.

Figure 11:
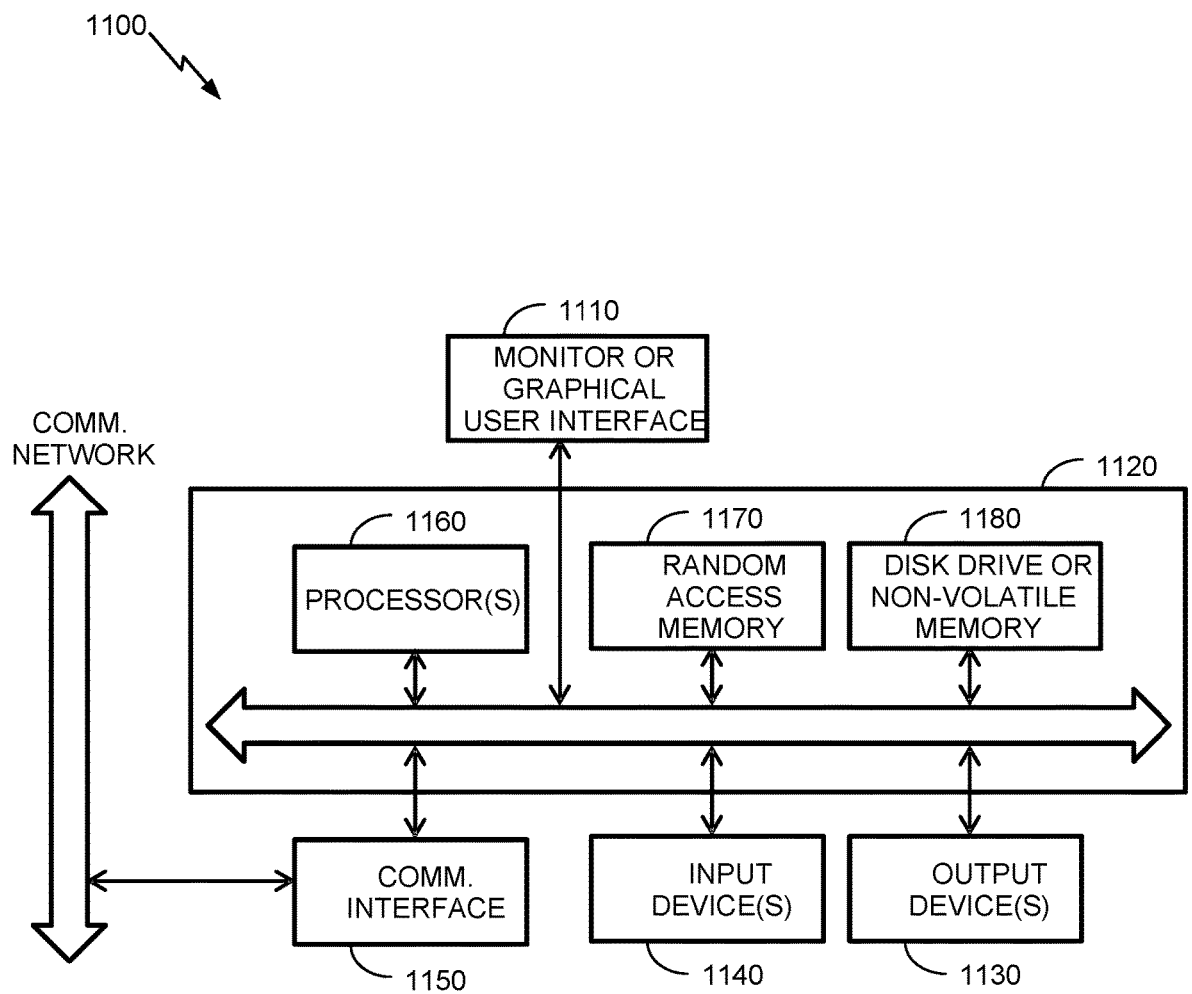
FIG. 11 illustrates an example of a computing system for compression-based MAC operation, in accordance with certain embodiments of the present disclosure.

FIG. 11 illustrates an example of a computing system for a compression-based MAC operation, in accordance with certain embodiments of the present disclosure, such as by including the processor 110 of FIG. 1. FIG. 11 is merely illustrative of an embodiment of the present disclosure and does not limit the scope of the disclosure as recited in the claims. In one embodiment, the system is a computer system 1100 that typically includes a monitor 1110, a computer 1120, user output devices 1130, user input devices 1140, communications interface 1150, and the like. The error correction system 100 of FIG. 1 implements some or all of the components of the computer system 1100.

As shown in FIG. 11, the computer 1120 may include a processor(s) 1160 that communicates with a number of peripheral devices via a bus subsystem. These peripheral devices may include the user output devices 1130, the user input devices 1140, the communications interface 1150, and a storage subsystem, such as random access memory (RAM) 1170 and disk drive 1180.

The user input devices 1140 include all possible types of devices and mechanisms for inputting information to the computer system 1120. These may include a keyboard, a keypad, a touch screen incorporated into the display, audio input devices such as voice recognition systems, microphones, and other types of input devices. In various embodiments, the user input devices 1140 are typically embodied as a computer mouse, a trackball, a trackpad, a joystick, a wireless remote, a drawing tablet, a voice command system, an eye-tracking system, and the like. The user input devices 1140 typically allow a user to select objects, icons, text, and the like that appear on the monitor 1110 via a command such as a click of a button or the like.

The user output devices 1130 include all possible types of devices and mechanisms for outputting information from the computer 1120. These may include a display (e.g., the monitor 1110), non-visual displays such as audio output devices, etc.

The communications interface 1150 provides an interface to other communication networks and devices. The communications interface 1150 may serve as an interface for receiving data from and transmitting data to other systems. Embodiments of the communications interface 1150 typically include an Ethernet card, a modem (telephone, satellite, cable, integrated services digital network (ISDN)), (asynchronous) digital subscriber line (DSL) unit, FireWire interface, USB interface, and the like. For example, the communications interface 1150 may be coupled to a computer network, to a FireWire bus, or the like. In other embodiments, the communications interface 1150 may be physically integrated on the motherboard of the computer 1120 and may be a software program, such as soft DSL or the like.

In various embodiments, the computer system 1100 may also include software that enables communications over a network such as HTTP, TCP/IP, RTP/RTSP protocols, and the like. In alternative embodiments of the present disclosure, other communications software and transfer protocols may also be used, for example, IPX, UDP, or the like. In some embodiments, the computer 1120 includes one or more Xeon™ microprocessors from Intel as the processor(s) 1160. Further, in one embodiment, the computer 1120 includes a UNIX-based operating system.

The RAM 1170 and the disk drive 1180 are examples of tangible media configured to store data such as embodiments of the present disclosure, including executable computer code, human-readable code, or the like. Other types of tangible media include floppy disks; removable hard disks; optical storage media such as CD-ROMs, DVDs, and bar codes; semiconductor memories such as flash memories, non-transitory read-only memories (ROMS), and battery-backed volatile memories; networked storage devices; and the like. The RAM 1170 and the disk drive 1180 may be configured to store the basic programming and data constructs that provide the functionality of the present disclosure.

Software code modules and instructions that provide the functionality of the present disclosure may be stored in the RAM 1170 and the disk drive 1180. These software modules may be executed by the processor(s) 1160. The RAM 1170 and the disk drive 1180 may also provide a repository for storing data used in accordance with the present disclosure.

The RAM 1170 and the disk drive 1180 may include a number of memories, including a main RAM for storage of instructions and data during program execution and a ROM in which fixed non-transitory instructions are stored. The RAM 1170 and the disk drive 1180 may include a file storage subsystem providing persistent (non-volatile) storage for program and data files. The RAM 1170 and the disk drive 1180 may also include removable storage systems, such as removable flash memory.

The bus subsystem provides a mechanism for letting the various components and subsystems of the computer 1120 communicate with each other as intended. Although the bus subsystem is shown schematically as a single bus, alternative embodiments of the bus subsystem may utilize multiple buses.

FIG. 11 is representative of a computer system capable of embodying the present disclosure. It will be readily apparent to one of ordinary skill in the art that many other hardware and software configurations are suitable for use with the present disclosure. For example, the computer may be a desktop, portable, rack-mounted, or tablet configuration. Additionally, the computer may be a series of networked computers. Further, the use of other microprocessors are contemplated, such as Pentium™ or Itanium™ microprocessors, Opteron™ or AthlonXP™ microprocessors from Advanced Micro Devices, Inc., and the like. Further, other types of operating systems are contemplated, such as Windows®, WindowsXP®, WindowsNT®, or the like from Microsoft Corporation; Solaris from Sun Microsystems; LINUX; UNIX; and the like. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable, non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory; non-volatile memory; magnetic and optical storage devices such as disk drives, magnetic tape, CDs, and DVDs; or other media now known or later developed that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A method implemented by a system to perform multiply and accumulate (MAC) operations, the system comprising an index buffer coupled to a table and an input buffer coupled to the table and to an accumulator, the method comprising:

determining that a first number is to be multiplied by a second number;

performing a MAC operation to multiply the first number by the second number, wherein performing the MAC operation comprises:

determining an index of a quantization level associated with the first number, wherein the index is represented by "m" bits, wherein the quantization level is represented by "l" bits, and wherein "l" is larger than "m,"

inputting the "m" bits of the index to the index buffer, determining, by at least using the index in a lookup of the table, "r" sets of "k" bits, wherein "r*k" is equal to "l" and wherein the "l" bits comprise the "r" sets of "k" bits, and using the "r" sets of "k" bits in shift and accumulation operations applied to the input buffer that stores a bit representation of the second number comprising shifting the input buffer by "k" bits of the "r" sets of "k" bits and accumulating the shifted input buffer in the accumulator; and applying the MAC operation during execution of an artificial intelligence (AI) model.

2. The method of claim 1, wherein the system comprises an artificial intelligence (AI) inference engine, wherein the first number comprises a weight of the AI model, wherein the second number comprises a variable of a transformation function of the AI model, and wherein the transformation function comprises a multiplication of the variable by the weight.

3. The method of claim 1, wherein using the "r" sets of "k" bits comprises:
determining, by using the "m" bits from the index buffer in the lookup of the table, a first set from the "r" sets of "k" bits, wherein the first set comprises "k" bits of the "l" bits and wherein "k" is smaller than "l,"
shifting the input buffer by "k" bits of the first set, and
accumulating the shifted input buffer in an accumulator buffer of the accumulator.

4. The method of claim 3, wherein using the "r" sets of "k" bits further comprises repeating the shifting operation and the accumulating operation for each remaining set of the "r" sets.

5. The method of claim 1, further comprising:
(a) generating a set "C" of candidate quantization values based on a power-of-two (PoT) quantization;
(b) clustering the candidate quantization values in "Q" clusters, wherein each of the "Q" clusters comprises a subset of the candidate quantization values and is represented by a statistical point based on the subset;
(c) replacing, for a first cluster of the "Q" clusters, the statistical point with a value from the set "C"; and
(d) generating the table, wherein the table comprises a first index corresponding to the first cluster and associates the first index with an "l" bit representation of the value.

6. The method of claim 5, wherein the PoT quantization comprises a
PoT non-uniform quantization expressed as $$2^f(\beta, r, k) = \beta \times S, S \subset C, C = \left\{ \sum_{i=0}^{r} = p_i \right\},$$

wherein $$p_i \in \left\{ 0, 1, \frac{1}{2^1}, \ldots, \frac{1}{2^{(2^k-2)}} \right\},$$

and wherein β is a scaling factor.

7. The method of claim 5, wherein the clustering is based on a target distribution of quantization values.

8. The method of claim 5, wherein the statistical point is replaced with the nearest neighbor from the set "C."

9. The method of claim 5, wherein the system comprises an artificial intelligence (AI) inference engine, wherein the method further comprises:
determining a performance of the AI inference engine by using "Q" statistical points that represent the "Q" clusters, wherein each of the "Q" statistical points comprises a weight of the AI model and wherein the table is generated based on the performance.

10. The method of claim 9, further comprising:
changing, based on the performance, at least one of: a value of "r," a value of "k," or a value of "Q."

11. The method of claim 10, further comprising:
upon changing the value of "r" or the value of "k," repeating operations (a)—(c).

12. The method of claim 10, further comprising:
upon changing the value of "Q," repeating operations (b)—(c).

13. The method of claim 5, wherein the system comprises an AI inference engine and wherein the method further comprises:
initializing weights of the AI model by using quantization level bit representation from the table; and
retraining the AI model based on the initialized weights.

14. A system comprising:
one or more processors, wherein at least one of the one or more processors comprises an index buffer coupled to a table and an input buffer coupled to the table and to an accumulator, and is configured to:
determine that a first number is to be multiplied by a second number;
perform a multiply and accumulate (MAC) operation to multiply the first number by the second number, wherein performing the MAC operation comprises:
determining an index of a quantization level associated with the first number, wherein the index is represented by "m" bits, wherein the quantization level is represented by "l" bits, and wherein "l" is larger than "m,"
inputting the "m" bits of the index to the index buffer,
determining, by at least using the index in a lookup of the table, "r" sets of "k" bits, wherein "r*k" is equal to "l" and wherein the "l" bits comprise the "r" sets of "k" bits, and
using the "r" sets of "k" bits in shift and accumulation operations applied to the input buffer that stores a bit representation of the second number comprising shifting the input buffer by "k" bits of the "r" sets of "k" bits and accumulating the shifted input buffer in the accumulator; and
applying the MAC operation during execution of an artificial intelligence (AI) model.

15. The system of claim 14, wherein at least one of the one or more processors is configured to:
generate a set "C" of candidate quantization values based on a PoT quantization;
cluster the candidate quantization values in "Q" clusters, wherein each of the "Q" clusters comprises a subset of the candidate quantization values and is represented by a statistical point based on the subset;
replace, for a first cluster of the "Q" clusters, the statistical point with a value from the set "C"; and
generate the table, wherein the table comprises a first index corresponding to the first cluster and associates the first index with an "l" bit representation of the value.

16. The system of claim 15, wherein the PoT quantization comprises a
PoT non-uniform quantization expressed as $$2^f(\beta, r, k) = \beta \times S, S \subset C, C = \left\{ \sum_{i=0}^{r} = p_i \right\},$$

wherein $$p_i \in \left\{0, 1, \frac{1}{2^1}, \dots, \frac{1}{2^{(2^k-2)}}\right\}$$

and wherein β is a scaling factor.

17. A device comprising:
one or more processors configured to:
determine that a first number is to be multiplied by a second number;
perform a multiply and accumulate (MAC) operation to multiply the first number by the second number, wherein performing the MAC operation comprises:
determining an index of a quantization level associated with the first number, wherein the index is represented by "m" bits, wherein the quantization level is represented by "l" bits, and wherein "l" is larger than "m,"
inputting the "m" bits of the index to an index buffer coupled to a table,
determining, by at least using the index in a lookup of the table, "r" sets of "k" bits, wherein "r*k" is equal to "l" and wherein the "l" bits comprise the "r" sets of "k" bits, and
using the "r" sets of "k" bits in shift and accumulation operations applied to an input buffer that stores a bit representation of the second number and that is coupled to the table and to an accumulator, comprising shifting the input buffer by "k" bits of the "r" sets of "k" bits and accumulating the shifted input buffer in the accumulator; and
applying the MAC operation during execution of an artificial intelligence (AI) model.

18. The device of claim 17, further comprising an artificial intelligence (AI) inference engine, wherein the first number comprises a weight of the AI model, wherein the second number comprises a variable of a transformation function of the AI model, and wherein the transformation function comprises a multiplication of the variable by the weight.

19. The device of claim 17, wherein using the "r" sets of "k" bits comprises:
determining, by using the "m" bits from the index buffer in the lookup of the table, a first set from the "r" sets of "k" bits, wherein the first set comprises "k" bits of the "l" bits and wherein "k" is smaller than "l,"
shifting the input buffer by "k" bits of the first set, and accumulating the shifted input buffer in an accumulator buffer of the accumulator.

20. The device of claim 19, wherein using the "r" sets of "k" bits further comprises repeating the shifting operation and the accumulating operation for each remaining set of the "r" sets.

* * * * *